(12) United States Patent
Yamane

(10) Patent No.: US 6,482,643 B2
(45) Date of Patent: Nov. 19, 2002

(54) ORGANIC WASTE DISPOSAL EQUIPMENT AND SYSTEMS

(76) Inventor: Takaaki Yamane, 4370 Oaza Naoe-cho, Hikawa-cho, Hikawa-gun, Shimane (JP)

( * ) Notice: Subject to any disclaimer, the term of this patent is extended or adjusted under 35 U.S.C. 154(b) by 0 days.

(21) Appl. No.: 09/790,910

(22) Filed: Feb. 23, 2001

(65) Prior Publication Data

US 2001/0040131 A1 Nov. 15, 2001

(30) Foreign Application Priority Data

Feb. 23, 2000 (JP) ........................................ 2000-046384

(51) Int. Cl.⁷ ................................................ C12M 1/02
(52) U.S. Cl. ............................... 435/290.4; 435/290.1; 435/290.2
(58) Field of Search ............................ 435/290.1–290.4

(56) References Cited

U.S. PATENT DOCUMENTS

| | | | | |
|---|---|---|---|---|
| 2,458,431 A | * | 1/1949 | Schlenz .................. 210/195.1 |
| 2,878,112 A | * | 3/1959 | Morrison ...................... 34/102 |
| 4,435,188 A | * | 3/1984 | Dedenon et al. ............. 210/180 |
| 4,795,711 A | * | 1/1989 | Nockemann .............. 435/290.2 |
| 5,093,262 A | * | 3/1992 | Kimura .................... 435/286.1 |
| 5,457,031 A | * | 10/1995 | Masse ........................ 220/4.28 |
| 5,753,498 A | * | 5/1998 | Ueda et al. .................. 366/320 |
| 6,284,527 B1 | * | 9/2001 | Ueda ........................ 435/290.2 |

* cited by examiner

Primary Examiner—David A. Redding
(74) Attorney, Agent, or Firm—Armstrong, Westerman & Hattori, LLP

(57) ABSTRACT

Organic waste disposal equipment and systems that make use of microbes' bioactivities with a feature of circulation mechanism so that wastes stored at the bottom part of a treatment tank is transferred to the upper part of its own or other tanks by lifting conveyors, and organic waste disposal equipment and systems that make use of microbes' bioactivities with a feature in its structure of having treatment tanks and lifting conveyors so that wastes stored at the bottom part of a treatment tank is transferred to the upper part of its own or other tanks by lifting conveyors.

3 Claims, 6 Drawing Sheets

(a)          (b)

ORGANIC WASTE DISPOSAL EQUIPMENT AND SYSTEMS

BACKGROUND OF THE INVENTION

Field of the Invention

This invention is concerned about improvements of organic waste disposal equipment and systems that utilize microbes' bioactivities.

As waste disposal capacity is a big problem for each local self-governing body nowadays, organic waste disposal equipment is spreading not only for home use but also among restaurants and other food businesses as well as poultry farming, hog-raising and other industries.

Waste disposal equipment is either a recycle type to make use of wastes as compost or a disappearance type to let most of wastes disappeared by microbes' bioactivities. Among these two, various kinds of the latter type, i.e. utilizing microbes, are sold by electrical appliances manufacturers and others as microbes are readily available due to the recent development of biotechnology.

One of the advantages of waste disposal equipment utilizing bioactivities is that you can readily introduce one as microbes let wastes almost disappear to save your time and trouble. This type of waste disposal equipment is not only useful at general households, apartments and condominiums or their adjacent restaurants, but also is utilized for industrial or commercial purposes as it is expandable to a large scale. Also in the case of processing by microbes, waste treatment containers are filled with decomposition media such as wooden chips, wooden dust or peat moss, etc. as a carrier to maintain microbes of soil and other types that decompose protein, cellulose, etc. These decomposition media provide microbes with fermentation beds so that wastes are disposed by fermentative decomposition. Wastes are loaded one after another to be decomposed and part or whole of decomposition media is available for use as compost after the decomposition process.

In the case of waste disposal utilizing bioactivities, sure and prompt disposal is achieved by mixing wastes with decomposition media in a dependable way. However, conventional waste disposal systems or equipment have a problem of wastes remaining non-decomposed because they mainly adopt mixing impellers within treatment tanks leaving some dead spaces where mixing is difficult. This problem has been a factor of inefficiency of decomposition process as well as a major cause of foul odors.

In addition, equipment structures and mixing methods of conventional systems have caused enlargement of equipment size bringing about various problems as a result. For example, there is a space problem and in many cases installation is impossible for large-sized waste disposal equipment. Moreover, due to the batch system employed, you have to wait for completion of decomposition process in one treatment tank before proceeding to the next decomposition process, in other words, a defect of slow response to the fluctuating disposal quantity.

Besides, there is a problem of lowering operational efficiency, as you have to suspend operation of the equipment for exchanging decomposition media or removing powdery dust and non-decomposable leftovers, which you have to do periodically. On top of this, in the case of waste disposal utilizing bioactivities, moisture content gradually accumulates to a saturation point as decomposition advances, which in turn prevents air circulation to make microbes weak or die out and reduces disposal capacity. This problem tends to become the more serious as the bigger treatment tanks are and also causes offensive odors due to the change into anaerobic conditions.

BRIEF DESCRIPTION OF THE INVENTION

In the wake of the above-mentioned problems, the inventor of this system has devoted himself to research and development to succeed in this invention. This invention has a feature in its treatment method that wastes are disposed by microbes while they are circulating within treatment tanks, i.e., wastes stored at the bottom part of a treatment tank are transferred to the upper part of its own or other tanks by lifting conveyors. A feature of this invention in its hardware mechanism, on the other hand, is that this waste disposal equipment utilizing bioactivities consists of waste treatment tanks and lifting conveyors that transfer wastes stored at the bottom part to the upper part of their own or other tanks.

DETAILED DESCRIPTION OF THE INVENTION

"Treatment tanks" stated in this document are containers to store wastes and decomposition media in which microbes are maintained. Wastes are disposed within treatment tanks by fermentative decomposition. Structures and shapes of treatment tanks can be any style without limitations. In the case of this invention, however, because content at the bottom part of treatment tanks is transferred to own or other tanks by lifting conveyors for blending and mixing purposes, the system with lifting conveyors equipped outside of treatment tanks (hereinafter referred to as [Outside conveyor type]) is made to have an outflow exit at the bottom part of treatment tanks so that content is sent to lifting conveyors or transfer devices connecting to the conveyors. In the case of this invention with lifting conveyors equipped inside of treatment tanks (hereinafter referred to as [Inside conveyor type]), content is circulated within treatment tanks as is done conventionally. The inside conveyor type may be equipped with plural numbers of conveyors to improve mixing efficiency. As to material of treatment tanks, plastics, stainless steel or other materials difficult to corrode are preferable. Decomposition media is a carrier to maintain microbes of soil and other types as above mentioned, for example, wooden chips, wooden dust, peat moss, active carbon not too wet, zeolite particles, ceramics balls, natural minerals, rice husks, etc.

In order to release powdery dust and water which are produced along with the microbes decomposition process, treatment tanks may be made to have through holes, mesh parts at their bottom part or equipped with containers having such holes or meshes as another option. Containers with through holes or mesh parts may be made of metal sheets with punching holes or metal wire nets, for example. In the case of plastics, punching or molds with many holes may be employed. Water receivers are fitted under a container with through holes and then water gathered should be discharged after treatment by water treatment devices or the like. Water receivers may be installed under plural numbers of such containers, too. Water treatment devices can be any general type without limitations.

Waste disposal equipment and systems of this invention can respond flexibly to increase or decrease of waste volume by either piling up or reducing treatment tanks. In this connection, lifting conveyors, either outside or inside type, may be added or reduced corresponding with the height of piled up treatment tanks. In the case of outside conveyor type, another lifting conveyor may be connected to the original lifting conveyor separately, or else you may set up a conveyor at the maximum permissible height from the beginning so that you may adjust it to load wastes into the uppermost tank by shooters or the like. Additionally, in the case of outside conveyor type, circulation of wastes may be done within one treatment tank (The piled up treatment tanks are regarded as one tank in this invention.) or among plural numbers of treatment tanks installed in parallel by transferring wastes from one tank to another in series by lifting conveyors. In this regard, those plural numbers of treatment tanks may be connected to form an endless mechanism to let wastes circulate therein and also may have a mechanism to open the last end treatment tank for discharging content so that you may make use of the equipment as a fertilizer maker.

"Lifting conveyors" are devices to transfer wastes at the bottom part to the upper part of treatment tanks. In the case of outside conveyor type, wastes may be transferred to either own or other tanks installed in parallel. A mechanism of lifting conveyors may be any style without limitations as long as it produces thrust force, for example, screw conveyors or mixing impellers with some angles. And also cutters may be built in at some part to crush wastes during the transfer process. In the case of outside conveyor type, you may design the bottom part of treatment tanks to send content into lifting conveyors or you may install screw conveyors or belt conveyors between treatment tanks and lifting conveyors separately.

"Air supply ducts" are devices to be installed within treatment tanks to help promote decomposition by sending oxygen into content of treatment tanks. Air supply ducts not only send in fresh air but also send in warm air to get appropriate temperature for microbes to thrive.

"Plastic pipes or tubes" are empty capsules of comparatively short length to be blended with decomposition media. Material of plastic pipes may be either hollow plastics such as PP (polypropylene) and PE (polyethylene), which are not affected by microbes, or biodegradable plastics to be decomposed after a certain period of time, for example, ones made from starch and protein as generally known, or ones made from chemical synthesis or utilizing microbes like lactic acid. In this invention, however, there are no limitations as long as they are biodegradable plastics decomposed by microbes under a certain condition. If you utilize biodegradable plastics, it is extremely convenient when you replace wastes of old decomposition media. It is also possible to adjust decomposition period to say, 3 months, 1 year, 2 years, etc. Shapes are not specific and may be square, oblong or polygonal without limitations. Size may be about 20 mm in diameter and 20 mm in length. Large quantities of these pipes are blended with decomposition media to make fermentative beds for microbes. Quantity of pipes should be about the same as decomposition media in volume under normal conditions.

In the case of fermentative beds blended with pipes, under highly damp or wet conditions due to a lot of moisture produced during waste decomposition process, the pipes are put into a condition where they are filled with decomposition media including microbes. Under this condition, decomposition media outside of pipes are reduced in volume allowing more gaps among pipes to facilitate air circulation, hence leading to more oxygen supply. On the other hand, because decomposition media turn to a dry condition as decomposition advances, decomposition media stacked inside of tubes come out to restore the original condition. By blending a lot of pipes or tubes, therefore, a good environment for microbes to thrive is maintained in response to too wet or too dry conditions of waste disposal process accordingly. In other words, the most important functions of decomposition media such as humidity control, air circulation and providing microbes with a settling place are fulfilled.

Furthermore, as microbes are protected inside of pipes, damages during mixing process are decreased to result in an advantage of maintaining their decomposition capability for a longer period. In the case of plastics pipes, friction is small and slippery among them to have an effect of lower energy required for mixing motion, better durability of decomposition media and longer period of continuous operation. You may also choose colors of pipes to create clean images.

PREFERRED EMBODIMENTS OF THE INVENTION

EXAMPLES

Figure 1:
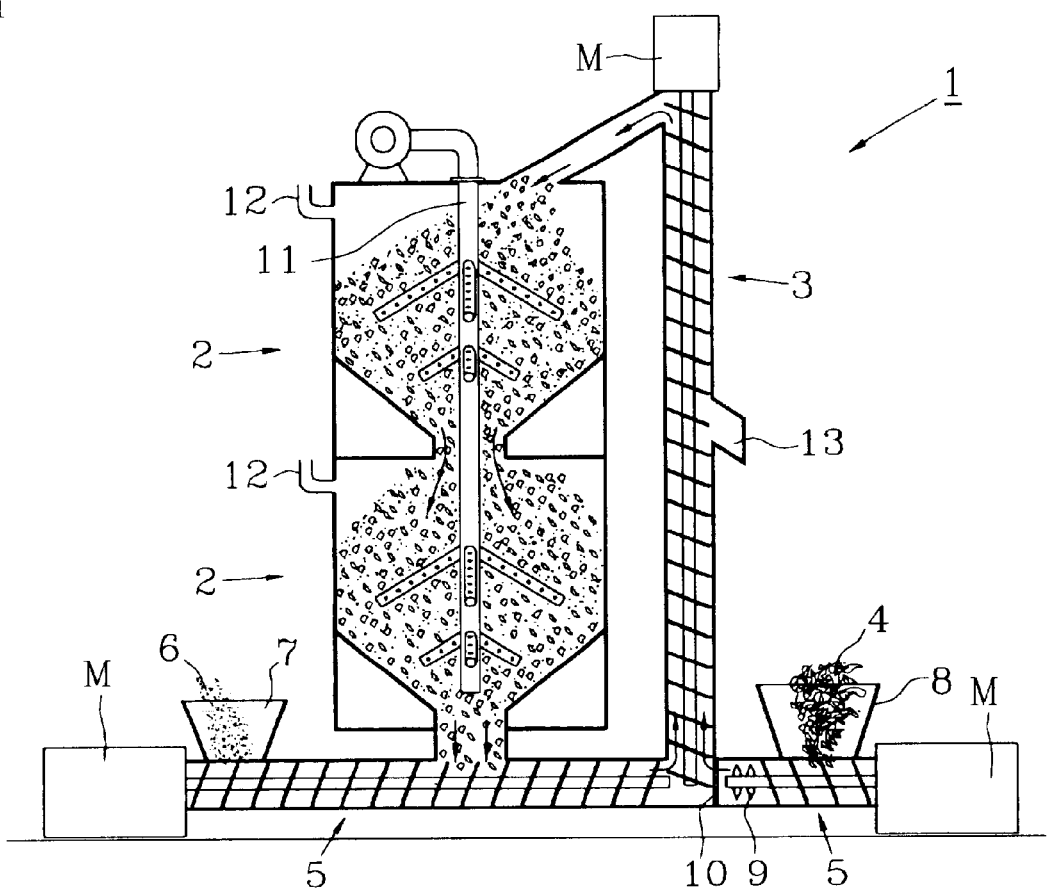
FIG. 1 is an outline cross section to show an example of implementation for the waste disposal system with regard to this invention.
Figure 2:
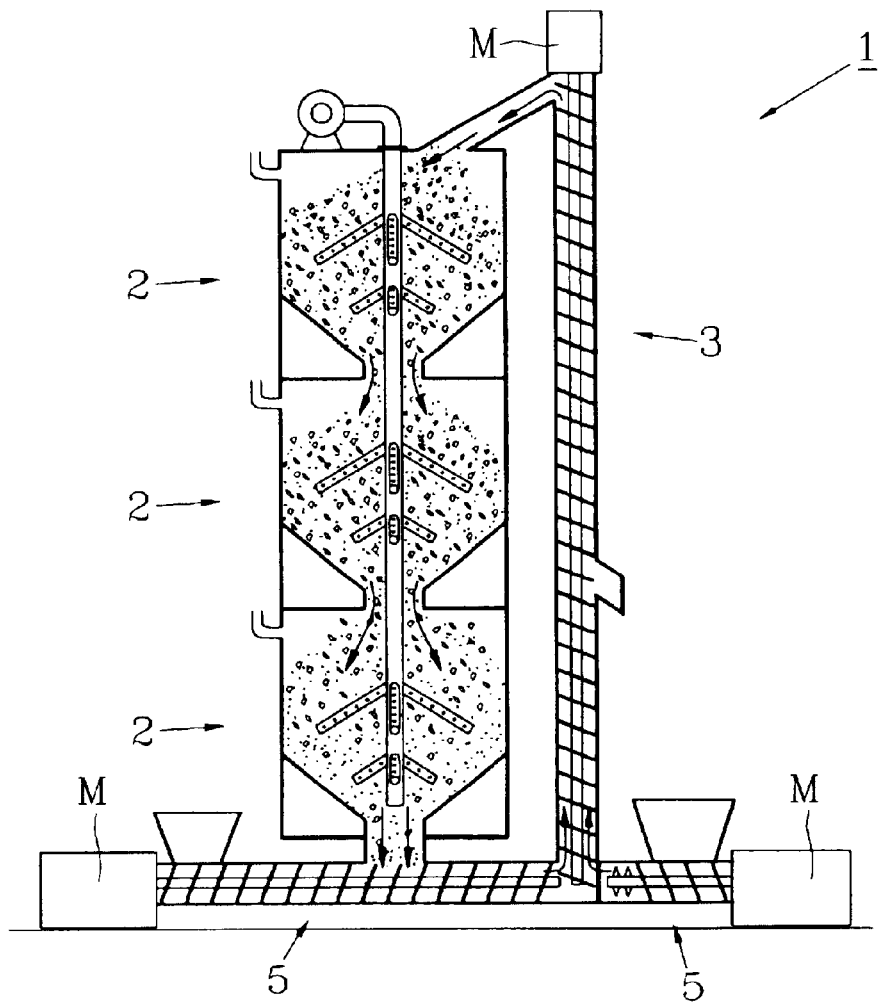
FIG. 2 is an outline cross section to show another example of implementation for the waste disposal system with regard to this invention.
Figure 3:
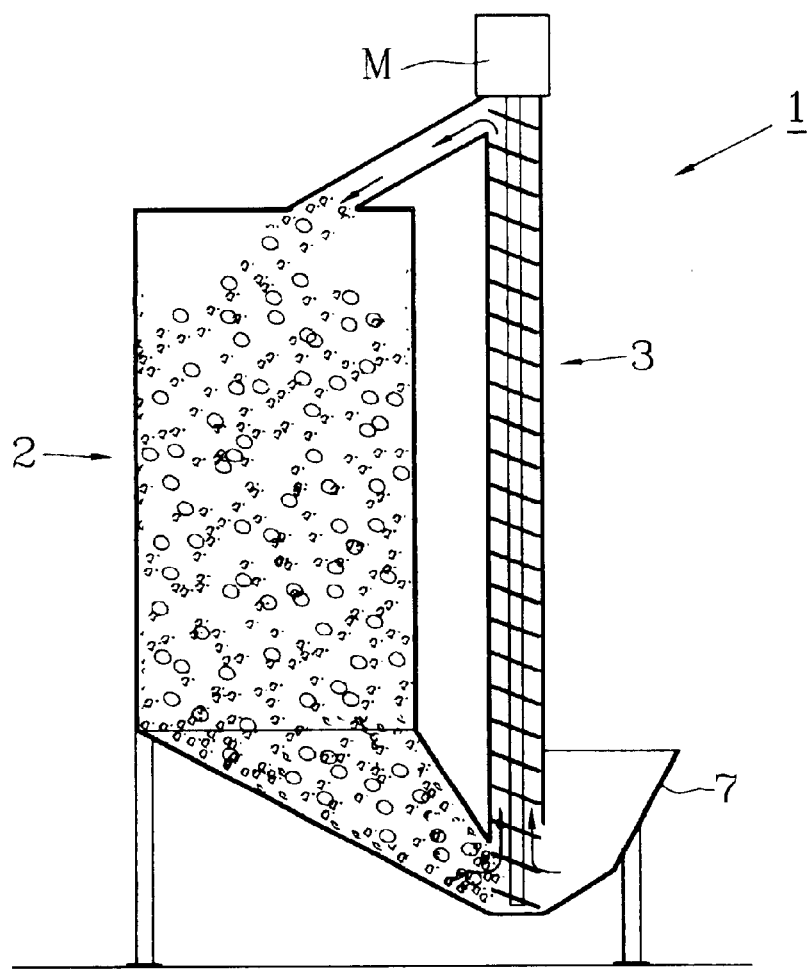
FIG. 3 is an outline cross section to show a further more example of implementation for the waste disposal system with regard to this invention.
Figure 4:
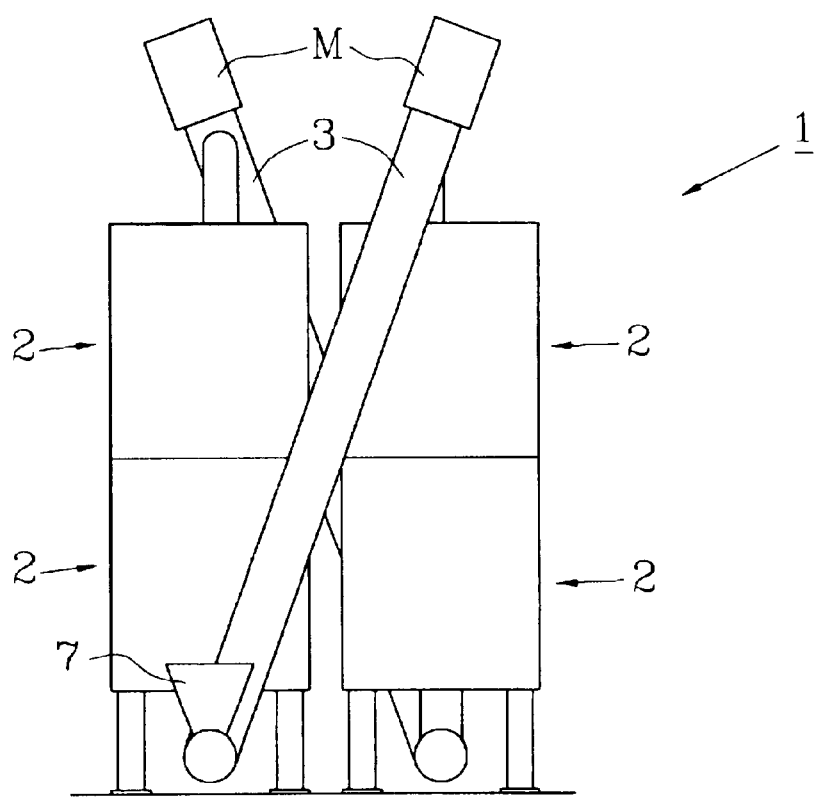
FIG. 4 is an outline cross section to show a further more example of implementation for the waste disposal system with regard to this invention.
Figure 5:
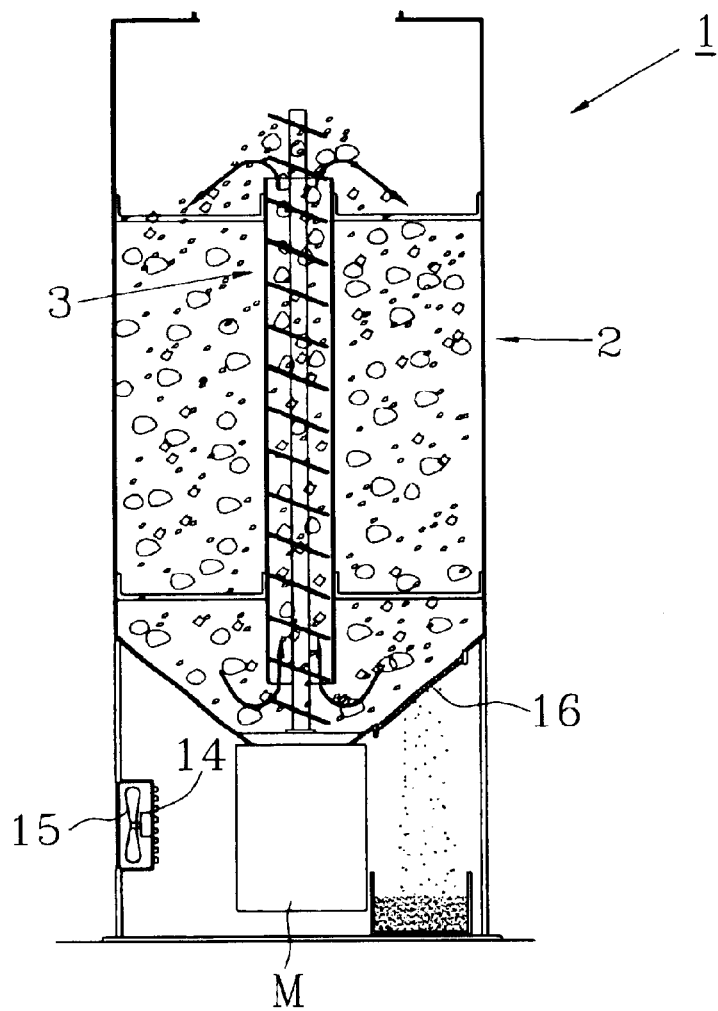
FIG. 5 is an outline cross section to show a further more example of implementation for the waste disposal system with regard to this invention.
Figure 6:
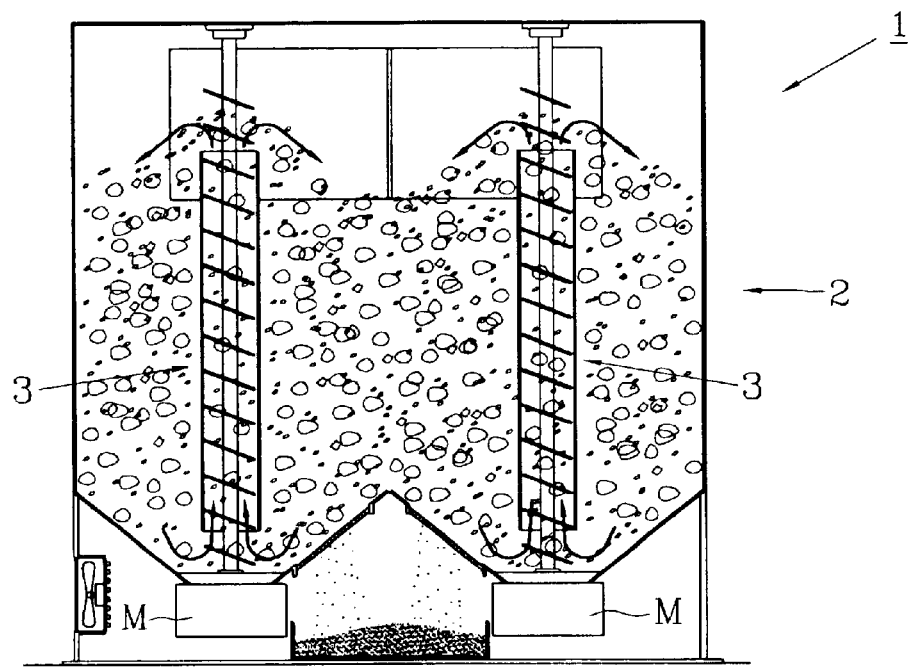
FIG. 6 is an outline cross section to show a further more example of implementation for the waste disposal system with regard to this invention.
Figure 7:
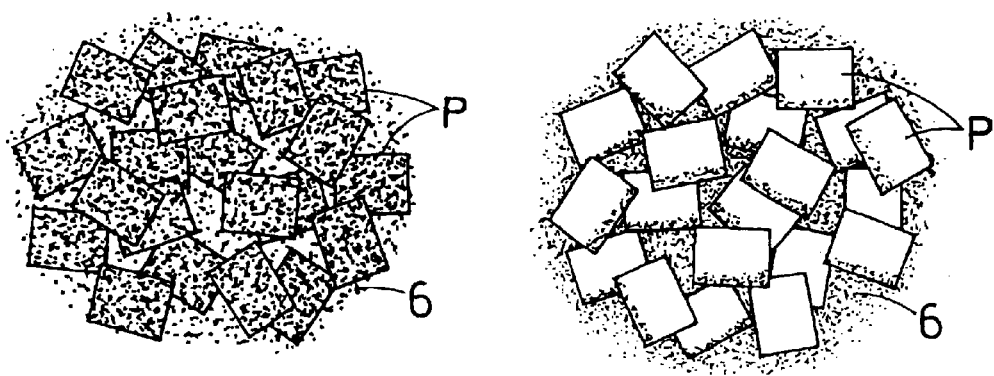
FIG. 7 is are outline drawings (a) and (b) to show conditions of decomposition media blended with plastic pipes respectively.

Detailed statement follows hereinafter with regard to implementation of this invention as shown in attached drawings.

Drawing 1 shows an example of implementation of waste disposal systems in regard to this invention. This is a system to dispose Waste 4 during the circulation process that content at the bottom part of Treatment tank 2 is transferred to the upper part of Treatment tank 2 by way of Lifting conveyor 3 installed at the side of treatment tanks. Waste disposal equipment 1 shown in this example is structured to have two treatment tanks piled up and content coming out of bottom side Treatment tank 2 is sent to Lifting conveyor 3 by way of Transfer conveyor 5. This Transfer conveyor 5 has a Hopper 7 wherein Decomposition media 6 is loaded when supplement is required. Also, Waste 4 is loaded onto Waste loading hopper 8 to be sent to Lifting conveyor 3 by way of Transfer conveyor 5 and then to the upper side Treatment tank 2. In front of Transfer conveyor 5 to send Waste 4, Cutter 9 may be installed to crush wastes, and at the same time Meshed net 10 may be installed at entrance part of Lifting conveyor 3 so that only wastes crushed into small pieces may pass. Lifting conveyor 3, Transfer conveyor 5 and Cutter 9 are driven by separate Driving motor M respectively. As explained above, Waste 4 is sent into Treatment tank 2 while mixing with Decomposition media 6 within Lifting conveyor 3.

Also, Air supply duct 11 is installed within Treatment tank 2 in this example. This Air supply duct 11 supplies fresh air to content inside of Treatment tank 2 in order to activate microbes movements. Air supply duct 11 may supply warm air of 30~35 degree C as well as fresh air. In addition to this, there is an Exhaust duct 12 within each Treatment tank 2 in order to discharge air from inside. Exhaust coming out of Exhaust duct 12 is normally discharged to open air after going through deodorizing equipment (not shown in the attached drawing). Lifting conveyor 3 is equipped with Outlet 13 in order to take out powdery dust and other content after Waste 4 is disposed.

As above explained, in the case of waste disposal equipment and systems of this invention, because combination of treatment tanks and lifting conveyors enables disposal of Waste 4 during its circulation process, setting of fermentation time adjustment of Waste 4 within Treatment tank 2 is now made possible by simply changing transfer speed of Lifting conveyor 3 and Transfer conveyor 5 (including suspension of operation). Moreover, this invention enables to adapt to the changing volume of Waste 4 because content at the bottom part of Treatment tank 2 is transferred to the upper part for circulation. For example, waste input can be increased by changing piles of treatment tanks from 2 to 3 stages as shown in Drawing 2. On the contrary, quantity of Treatment tank 2 may be reduced when disposal volume is decreased. In this example, screws and outer cylinders inside Lifting conveyor 3 are extended to adjust height in order to modify Treatment tank 2 from 2 stages of Drawing 1 to 3 stage of Drawing 3.

Another example of implementation of Waste disposal equipment 1 under this invention is shown in Drawing 3, i.e. content is sent from the bottom part of Treatment tank 2 directly into Lifting conveyor 3. Waste 4 and Decomposition media 6 are loaded onto Hopper 7 attached to Lifting conveyor 3. Furthermore, two units of Treatment tank 2 may be installed side by side as shown in Drawing 4 so that content of these two treatment tanks is circulated by way of Lifting conveyor 3. In other words, content of left-hand side Treatment tank 2 should be transferred to right-hand side Treatment tank 2 by way of Lifting conveyor 3 of this side, and content of right-hand side Treatment tank 2 should be transferred to left-hand side Treatment tank 2 by way of Lifting conveyor 3 of the opposite side, thus effectuating circulation of content.

Drawing 5 shows another example of implementation of Waste disposal equipment 1 of this invention, with Lifting conveyor 3 within Treatment tank 2. As illustrated here, mixing of content by circulation is possible even if Lifting conveyor 3 is installed within Treatment tank 2, and adjustment of circulation speed is made possible by varying transfer speed of Lifting conveyor 3. This inside conveyor type has the same flexibility as the outside conveyor type in that adaptation to changing volume of Waste 4 is made possible by piling up plural numbers of Treatment tank 2 along with extension of Lifting conveyor 3. In this example, the bottom part of Treatment tank 2 is enclosed to have Fan 15 with Heater 14 therein to warm up so that microbes' movements are activated. In this case, another option is to send in warm air by installing Air supply duct 11 as aforementioned. Also, powdered dust may be discharged through Meshed part 16 which is prepared at some corner of the bottom part of Treatment tank 2.

Inside Treatment tank 2, plural numbers of Lifting conveyor 3 may be equipped. For example, as shown in Drawing 6, mixing of content by circulation may be done with 2 units of Lifting conveyor 3 equipped within Treatment tank 2. Of course, 3 units or more of Lifting conveyor 3 may be equipped according to the size of Treatment tank 2. Furthermore, Treatment tank 2 may be installed in parallel one after another in accordance with quantity of waste for disposal. In other words, as shown in Drawing 5, all or part of side panels of Treatment tank 2 should be structured to be removable so that tanks may be connected one after another accordingly.

Many pieces of Plastic pipe P may be blended with Decomposition media 6 in order to promote disposal of Waste 4. By blending Plastic pipe P, under a highly damp condition due to the moisture content produced during decomposition process, capsules filled with Decomposition media 6 within such pipes are formed as decomposition by microbes advances, as shown in Drawing 7(a). Under such a highly damp condition, air circulation is hampered in conventional systems and oxygen supply to microbes is remarkably decreased. When large quantities of pipes filled with decomposition media are blended, however, gaps are created among such Plastic pipe P each other to facilitate air circulation maintaining oxygen supply. When decomposition process further advances, Decomposition media 6 turn to a dry condition, as shown in Drawing 7(b), to let decomposition media within Plastic pipe P come out to restore original conditions, enabling a much prolonged period of exchanging Decomposition media 6.

EFFECT OF THE INVENTION

As above stated, the waste disposal equipment and systems of this invention achieve a remarkably high treatment efficiency by implementing greatly improved mixing method compared with conventional systems along with its mechanism of disposing wastes by transferring content at the bottom part of treatment tanks to own or other treatment tanks by way of lifting conveyors. In addition, as it is easy to increase or decrease the number of treatment tanks, you may deal with changing volume of wastes flexibly and increase disposal capacity without altering installation space required. Moreover, you can adjust time of stay for content to be kept within treatment tanks by varying speed of lifting conveyors, and this feature leads to an effect of easy setting of various conditions such as fermentation time required for waste disposal according to kind and volume of wastes.

Furthermore, because this invention adopts circulation mechanism in the disposal of content along with many pieces of plastic pipes being blended with decomposition media, a splendid environment for microbes to thrive is obtainable such as moisture content adjustment, maintenance of air circulation, supply of a settling place for microbes. As a consequence, this invention brings about an extremely useful effect in practice, for example, waste disposal process can be maintained for a long time without supervision.

What we claimed is:

1. Organic waste disposal equipment for facilitating decomposition of waste, comprising:

plural treatment containers for holding waste, wherein said containers are vertically stacked and wherein said containers have frustoconical bottoms; and means for transferring the waste from the bottom of the lowest container to the top of the highest container.

2. Organic waste disposal equipment for facilitating decomposition of waste, comprising:

at least two sets of plural treatment containers for holding waste, wherein in each set said containers are vertically stacked and wherein said containers have frustoconical bottoms; and means for transferring the waste from the bottom of the lowest container of one container set to the top of the highest container of a different container set.

3. Organic waste disposal equipment of claim 1 or 2, wherein non-contiguous pipe segments are distributed throughout the interior of the containers.

* * * * *